June 9, 1925.
F. P. SOUDER
1,541,534
SAFETY CONTROL HELICOPTER
Filed Jan. 21, 1925
2 Sheets-Sheet 2
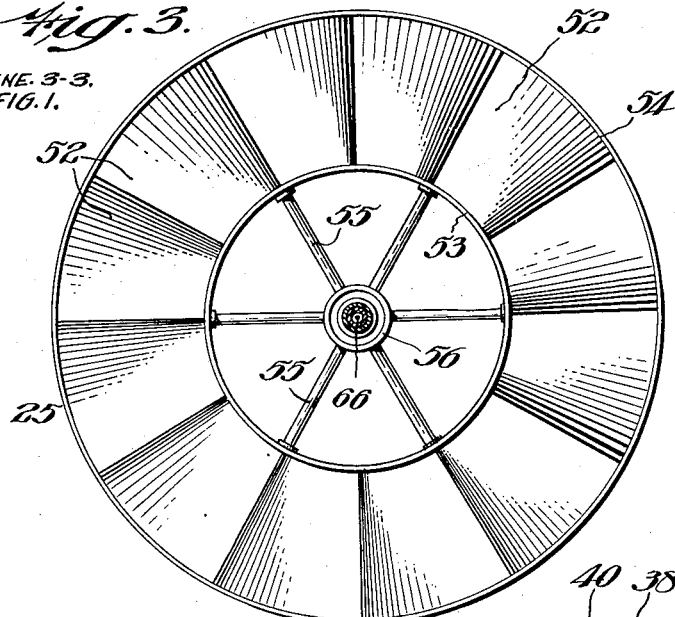
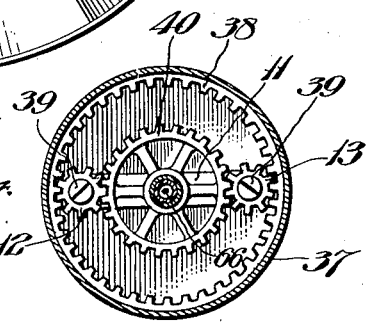
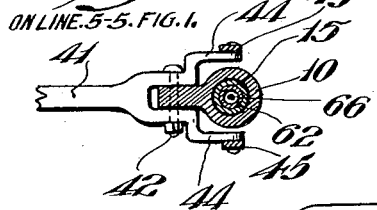
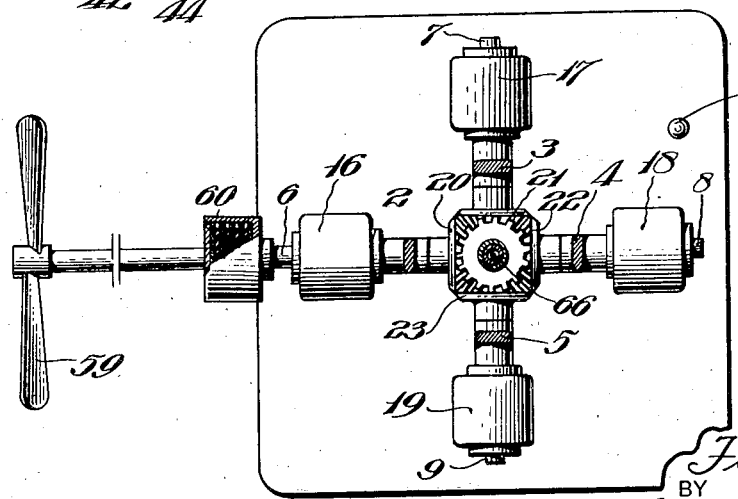
INVENTOR:
Frank P. Souder
BY
ATTORNEYS Patented June 9, 1925.

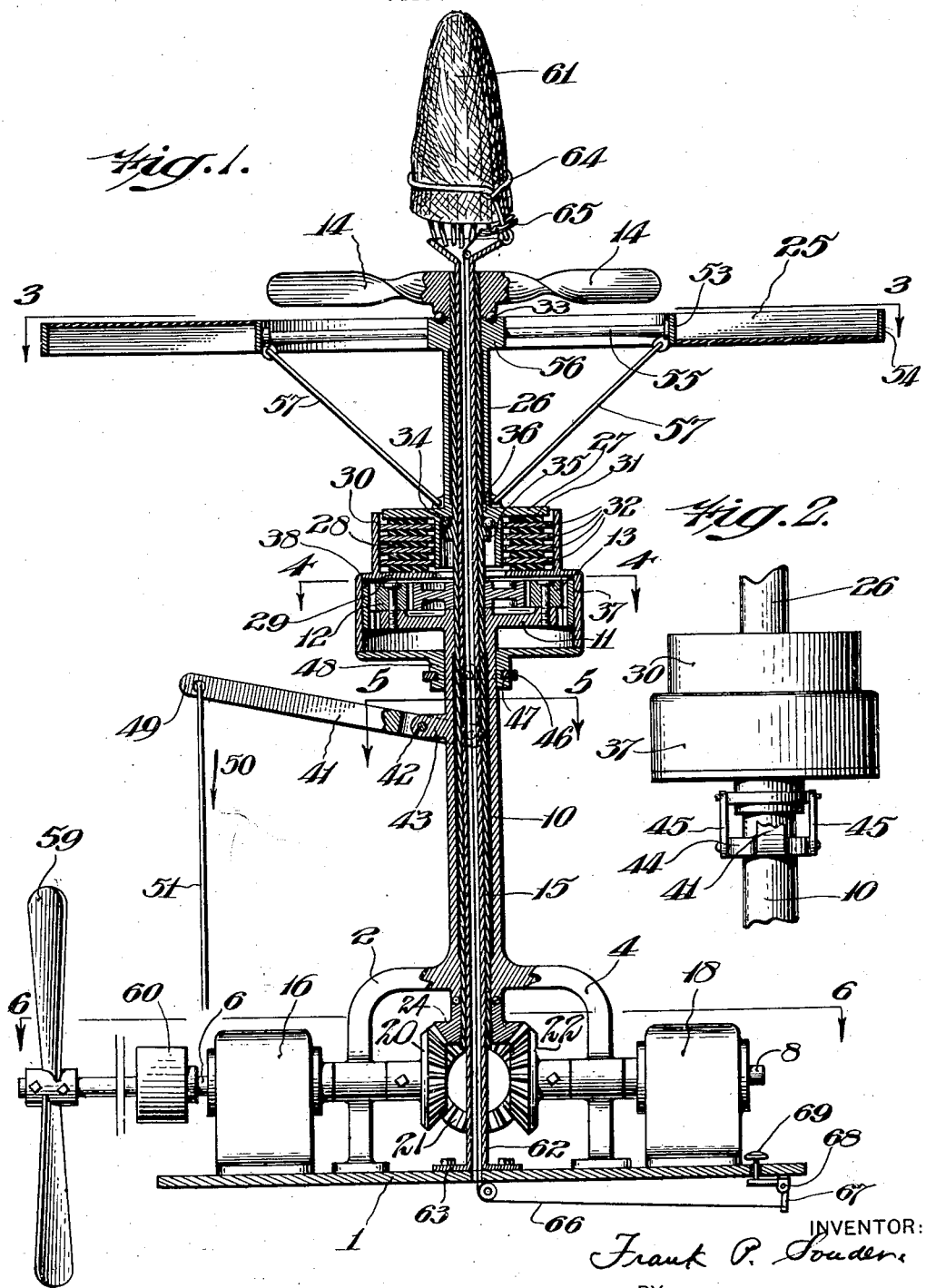

1,541,534

UNITED STATES PATENT OFFICE.

FRANK P. SOUDER, OF BRIDGETON, NEW JERSEY.

SAFETY-CONTROL HELICOPTER.

Application filed January 21, 1925. Serial No. 3,734.

*To all whom it may concern:*

Be it known that I, FRANK P. SOUDER, a citizen of the United States, and residing at Bridgeton, in the county of Cumberland and State of New Jersey, have invented a new and useful Safety-Control Helicopter, of which the following is a specification.

My invention relates to a new and useful improvement in aerial vehicles known as helicopters, and it relates more particularly to a novel control for the driving propellers and lifting propellers, as well as certain novel safety means whereby the hazards of this type of aerial machines are greatly reduced.

With the above ends in view my invention consists of a pair of concentric lifting propellers, a pair of concentric drive shafts for the same, and a friction control clutch interposed between the two concentric drive shafts for controlling the relative speeds of rotation of these two shafts so as to vary the resultant torque on the machine proper, thereby effecting a change in the direction of travel of the machine.

My invention further consists of a novel safety device and construction in such aerial vehicles, whereby any accidental descent of the machine may be retarded by merely releasing such safety device into the operative position.

For the purpose of illustrating my invention I have shown in the accompanying drawings forms thereof which are at present preferred by me, since they have been found in practice to give satisfactory and reliable results, although it is to be understood that the various instrumentalities of which my invention consists can be variously arranged and organized and that my invention is not limited to the precise arrangement and organization of these instrumentalities as herein shown and described.

Fig. 1, represents a side elevation partly in section, of a helicopter embodying my invention.

Fig. 2, represents a detailed view of the control device.

Fig. 3, represents a sectional view of the outer propeller on line 3—3 of Fig. 1.

Fig. 4, represents a sectional view on line 4—4 of Fig. 1.

Fig. 5, represents a section on line 5—5 of Fig. 1.

Fig. 6, represents a section on line 6—6 of Fig. 1.

Referring to the drawings, 1 designates the base of my novel safety control helicopter, upon which is mounted a set of four bearing frames 2, 3, 4 and 5, adapted to support the four engine shafts 6, 7, 8, and 9 respectively, in proper relation to each other, and also a vertically extending hollow frame 10, integral with said bearing frames 2, 3, 4 and 5, and having cross member 11 on the upper end thereof supporting the pair of idler gears 12 and 13. The lifting propeller 14 is carried by a hollow shaft 15 extending through the vertical frame portion 10, and is driven directly by the four engines 16, 17, 18 and 19 through the corresponding bevel gears 20, 21, 22 and 23 and the bevel gear 24 carried by the lower end of said drive shaft 15, as shown in Figures 1 and 6.

The outer propeller 25 in turn is carried by the outer hollow shaft 26, which is carried by and revolves about the upper end of the direct driven propeller shaft 15. The lower end of the propeller shaft 26 carries a driven plate 27 of a friction disk clutch 28, of any suitable standard construction, and shown particularly in the vertical section in Figure 1, whereby the propeller shaft 26 and hence the propeller 25 may be driven by engagement with the direct driven shaft 15 through said clutch 28. The driving plate 29 of said friction clutch 28 is carried by the housing 30 of the same, while the alternate annular friction disks 31 and metallic disks 32, are interposed between said driven plate 27 and driving plate 29 in the usual manner. The indirect propeller shaft 26, as well as the driven plate 27 carried at the lower end thereof, is supported and retained against any longitudinal movement with respect to the direct propeller shaft 15, by means of an upper thrust ball bearing 33 and a lower thrust ball bearing 34, interposed between the two propellers 14 and 25 on one hand, and the annular shoulders 35 and 36 on the other hand. The friction disk clutch 28 is provided with annular lower housing 37 carrying the internal gear 38 along the inner periphery thereof, which is in mesh at all times with the idler gears 12 carried by the cross arm 11 of the frame member 10, on the studs 39, as shown particularly in Figs. 1 and 4. The direct propeller shaft 15 is provided with a gear 40 fixed thereto, and in mesh with the idler gears 12 and 13, thereby imparting a rotation to the lower housing 37 and to the driving plate 29, in a direction opposed to the direction of the rotation of the direct propeller shaft 15. The speed of the indirect propeller is less than the speed of rotation of the direct propeller shaft 15; or two counter rotary speeds thus produced are proportional to the number of teeth on the gear 40 and the internal gear 38. When it is desired to revolve the outer propeller 25 it is only necessary to raise the housing 37 against the driving plate 29, so as to compress the friction disks 31 and thereby engaging the driven plate 27 carried by the propeller shaft 26. In order to facilitate the ready operation of this friction disk clutch, for the purpose of imparting the rotary motion to the propeller 25, and also in order to vary the relative speeds of the propellers 14 and 25, through the slippage of the friction disk clutch 28, I provide a clutch actuating lever 41 pivoted at 42 to an extension 43 of the housing member 10, the forked inner end 44 of which straddles the frame member 10, and carries a pair of connecting links 45 pivotally secured thereto and also pivotally secured to a thrust ring 46 running freely within the corresponding annular groove 47 and the lower extension 48 of the housing 37. Thus by lowering the outer end 49 of the lever 41 in the direction of the arrow 50, by any suitable means such as the rod 51, the housing 37 and hence the driving plate 29 is forced upwardly into engagement with driven plate 27, thereby engaging said driven plate and revolving the propeller 25. By varying the pressure on the end of the lever 41, a varying amount of slippage may be produced between the driving plate 29 and the driven plate 27, of the friction disk clutch 28, so as to vary the relative speed between the two propellers 14 and 25. By this variation in the two relative speeds of opposed propeller blades 14 and 25 the resultant torque on the entire machine is varied so as to permit the machine to be turned in any direction by simple varying relative speeds of the propellers 14 and 25 as described above.

If it is desired to travel straight ahead in a straight line, it is only necessary to so adjust the relative speeds of the two propellers 14 and 25 by means of the varying pressure of the friction clutch 28 so that the torques produced by said two propellers will be equal and hence the resultant torque will be zero.

The direct driven propeller 14 may be of any suitable construction. The indirect driven propeller 25 is preferably of the type shown in Figs. 1 and 3, namely is composed of a series of blades 52, having their edges superimposed and extending and supported between the two concentric annular rings 53 and 54. This integral structure of blades 52 supported between the two annular rings 53 and 54, is carried by a number of radius rods 55 extending between the upper end 56 of the propeller shaft 26 and the inner ring 53, and a number of corresponding brace rods 57 extending between the outer ends of the radius rods 55 and the lower end of the propeller shaft 26. By this construction the air engaged by the propeller 14 is given a free path through the center of the propeller 25 without any interference with the effectiveness of the propeller 25. Since the direct propeller 14 is considerably smaller in surface area as well as in diameter than the outer propeller 25, the speed or rotation is correspondingly greater, as is provided for by the proper ratio of teeth on the gear 40 and internal gear 38 respectively, as brought out heretofore.

A tractor propeller 59 of any suitable construction, is driven from any one of the engine or drive shafts 6, 7, 8 and 9, in any suitable manner, through the friction clutch 60 provided for that purpose, and represented in a general way in Figs. 1, and 6. Thus having risen to a desired height the friction clutch 60 is brought into operation thereby engaging the tractor propeller 59, so as to revolve the same and cause the machine to travel forward.

As a safety provision against any failure to the driving force of the engines 16, 17, 18 and 19 and against any failure of the lifting propellers 14 and 25, I provide a parachute 61 of any suitable and well known construction; of the type which is forced open by a spring mechanism when released. The parachute is secured to and carried by a vertical hollow standard 62, extending through the hollow direct driven propeller shaft 15, and secured at the bottom thereof at 63, to the base of the machine 1. The parachute 61 is normally held closed by the flexible cords 64 as shown in Fig. 1. A shearing device 65 is supported by the upper end of the vertical standard 62, in alignment with said flexible cord 64, and is provided with a cord or wire 66 extending through the hollow standard 62, to a bell-crank lever 67 pivoted at 68 and operated by a foot treadle 69. Thus if it is desired to release the parachute 61 into the open position in case of any failure of the mechanism, it is only necessary to step on, or exert any other pressure on the treadle 69 thereby pulling the cord or wire 66 which actuates the shearing device 65, so as to sever the retaining cord 64, which holds the parachute 61 closed. Thus in case of any sudden or accidental descent of the machine, the descent of the machine may be sufficiently retarded to make such descent safe.

Having thus described my invention, what I claim as new and desire to secure by Letters Patent, is:—

1. In a device of the character stated, a base, a motor carried by said base, a plurality of upright concentric shafts, one of which is driven by said motor, lifting propellers positioned on the upper ends of said shafts, a housing enclosing said shafts, a clutch housing rotatably mounted on said shaft housing, an inner clutch member, gearing and clutch discs contained in said clutch housing, and means for actuating said clutch discs for controlling the relative speed of rotation of said propellers.

2. In a device of the character stated, a base, a vertically disposed frame carried by said base, a direct propeller shaft extending through said frame, means for rotating said direct propeller shaft, propeller on the upper end thereof, a tubular indirect propeller shaft, a propeller on the upper end of said indirect propeller shaft, a housing for said shafts, gearing carried by said housing for imparting rotary motion from said direct propeller shaft to said indirect propeller shaft, and frictional means common to said gearing, and said indirect propeller shaft for controlling the relative rotation of said propellers.

3. In a device of the character stated, a base, a vertically disposed frame carried by said base, a direct propeller shaft mounted in said frame, means for rotating said direct propeller shaft, a propeller on the upper end thereof, a tubular indirect propeller shaft, a propeller on the upper end of said indirect propeller shaft, a housing for said shafts, gearing carried by said housing for imparting the rotary motion from said direct propeller shaft to said indirect propeller shaft, a housing for said gearing, frictional means common to said gearing and said indirect propeller shaft for controlling the relative rotation of said propellers, an actuating lever for said frictional means fulcrumed upon said shaft housing and provided with bifurcated arms, and connections from said arms to said gear housing.

4. In a device of the character stated, a base, a vertically disposed frame carried by said base, an idler gear carried by the top of said frame, an internal gear rotatably mounted on said frame and in mesh with said idler gear, a direct propeller shaft extending through said frame, a pinion carried by said direct propeller shaft in mesh with said idler gear, means at the lower end of said direct propeller shaft for driving the same, and a propeller carried by the upper end thereof, a tubular indirect propeller shaft surrounding the upper portion of said direct propeller shaft, and frictional means intermediate said indirect propeller shaft and said internal gear for imparting a rotary motion from said direct propeller shaft to said indirect propeller shaft.

5. In a device of the character stated, a base, a vertically disposed direct propeller shaft, a tubular indirect propeller shaft surrounding the latter, a friction clutch intermediate said two vertical shafts, a plurality of horizontally disposed drive shafts operatively connected with the lower end of said direct propeller shaft, a horizontal propeller shaft in operative engagement with one of said drive shafts, and frictional means intermediate said horizontal propeller shaft and said drive shaft to engage and disengage said horizontal propeller shaft at will.

6. In a device of the character stated, a base, a vertically disposed frame, a hollow standard extending therethrough, a parachute carried by the upper end of said hollow standard for retarding any accidental descent of the device, means for retaining said parachute in the closed position normally, shearing device for severing said retaining means, a releasing treadle mounted on said base, and means extending through said hollow standard for operatively connecting said shearing device and said treadle.

FRANK P. SOUDER.